Patented Nov. 11, 1930

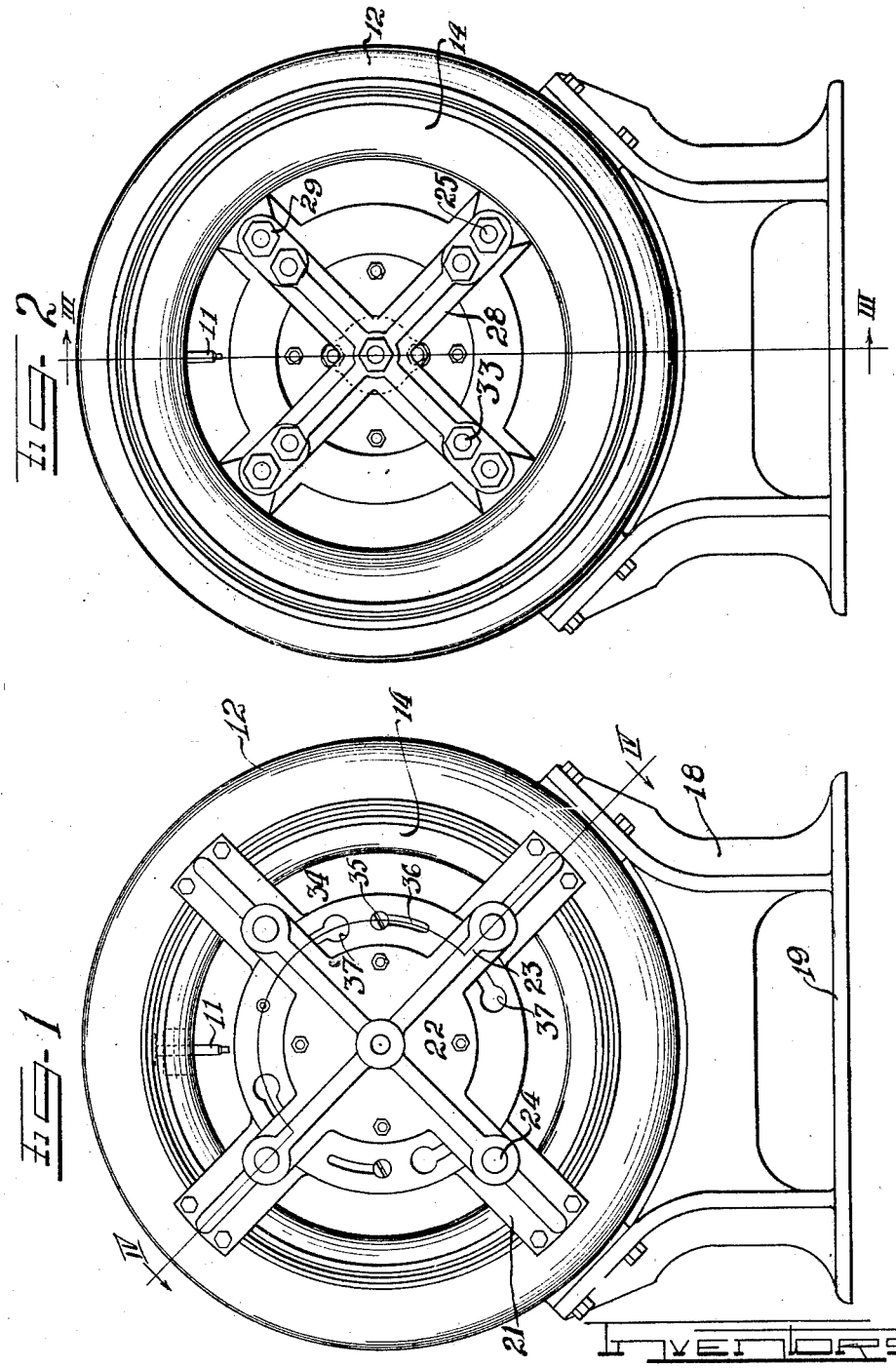

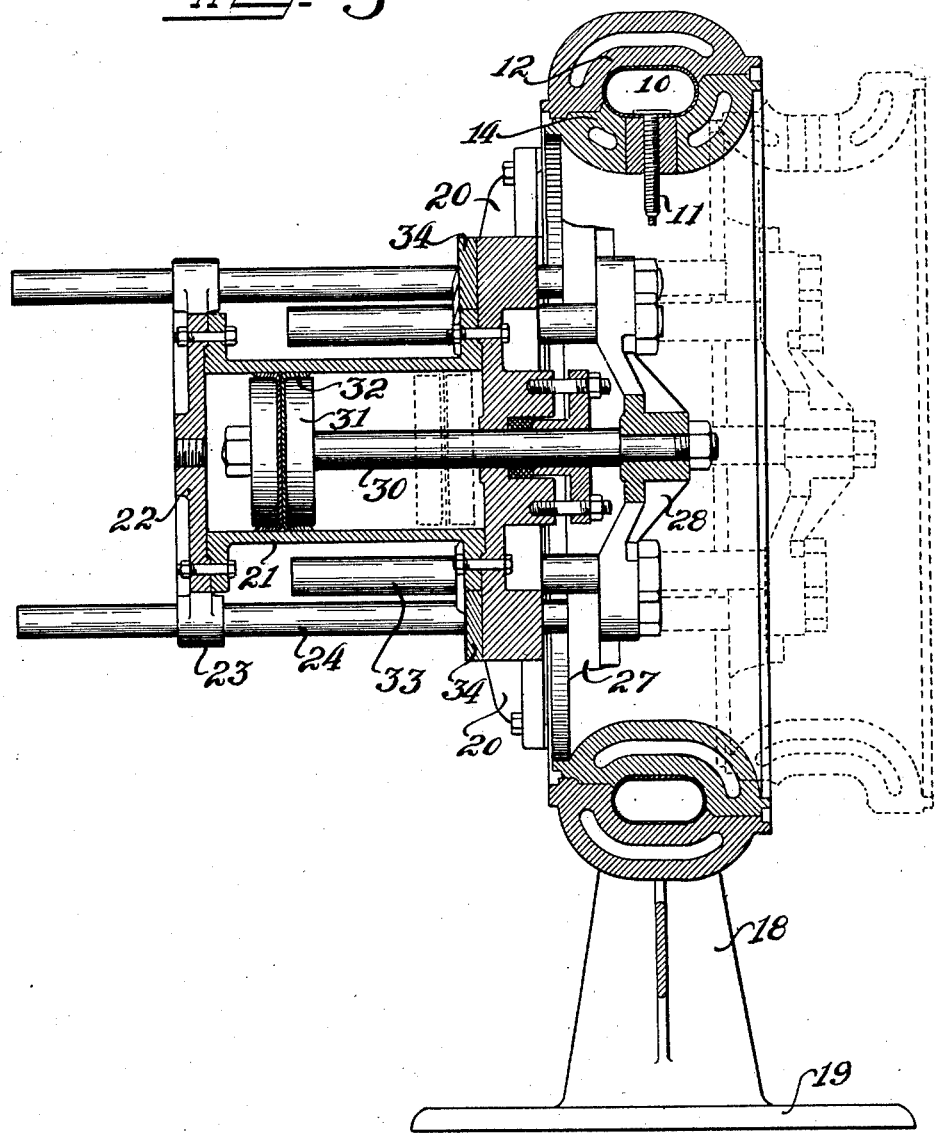

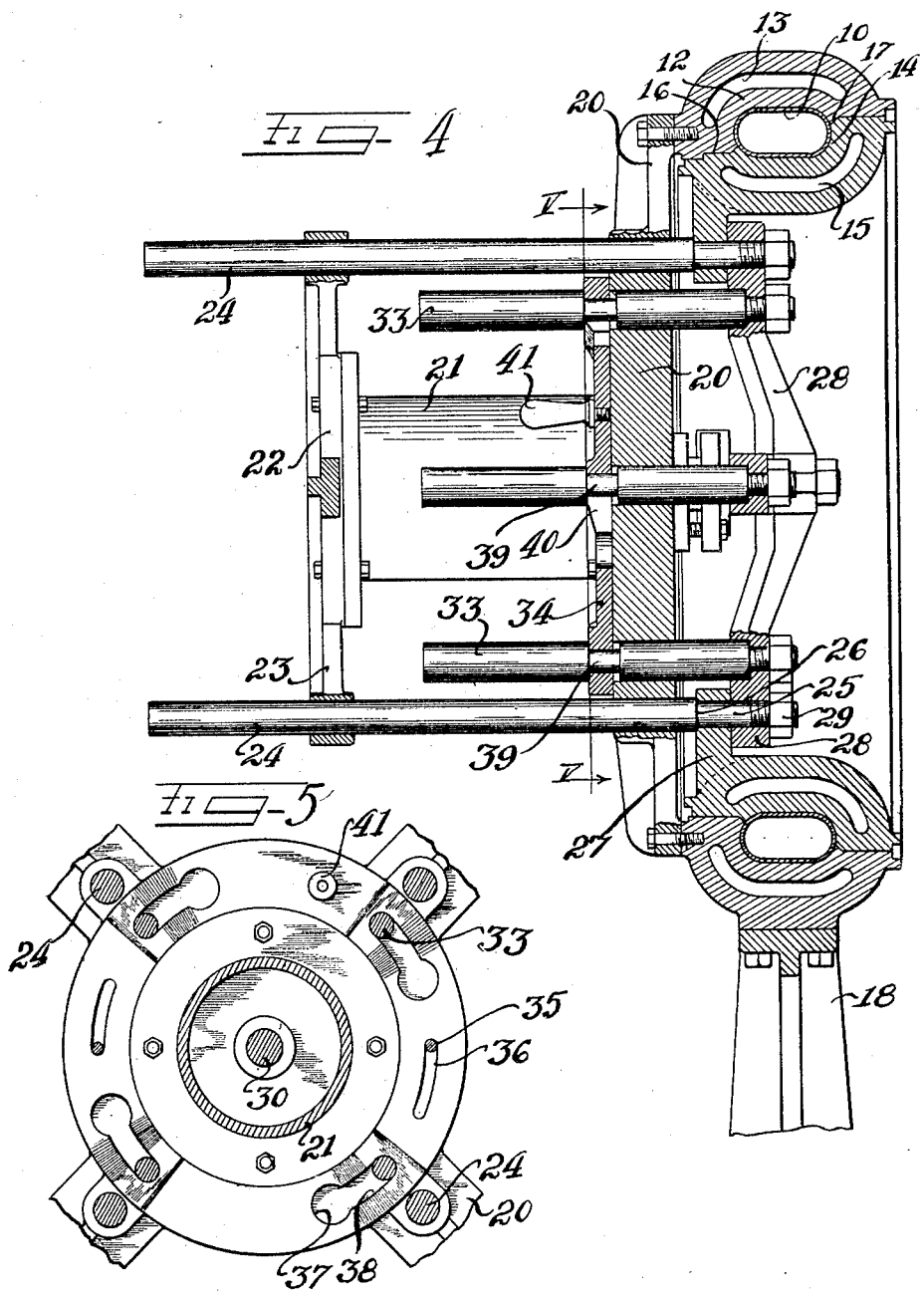

1,781,393

UNITED STATES PATENT OFFICE

RALPH W. HUTCHENS AND ARNOLD R. KRAUSE, OF EAU CLAIRE, WISCONSIN, ASSIGNORS TO GILLETTE RUBBER CO., OF EAU CLAIRE, WISCONSIN, A CORPORATION OF WISCONSIN

UPRIGHT INNER-TUBE MOLD

Application filed July 9, 1927. Serial No. 204,639.

This invention relates to an individual tube vulcanizer for automobile tire tubes.

It is an object of this invention to provide an individual vulcanizer for producing endless tire tubes in circular form, thus eliminating the splicing heretofore required when tubes have been formed on straight and curved mandrels and vulcanized thereon and afterwards spliced.

It is also an object of this invention to provide an improved form of tube wherein the thick section at the splice is vulcanized at the same time as the balance of the tube and the tube itself is formed as a flattened ellipse in cross section in order to render assembly in a tire carcass and mounting on the rim easier with a great reduction in the possibility of pinching the tube during the mounting operation.

It is another object of the invention to provide an improved and quick acting lock for an individual vulcanizer adapted to draw the mold sections into accurate register.

Other and further important objects of this invention will be apparent from the disclosures in the drawings and specification.

This invention (in a preferred form) is illustrated in the drawings and hereinafter more fully described.

On the drawings:

Figure 1 is a rear elevation of a device embodying the features of this invention.

Figure 2 is a front elevation thereof.

Figure 3 is a section on the line III—III of Figure 2 showing the open position of the mold in dotted lines.

Figure 4 is a section on the partly circular line IV—IV of Figure 1.

Figure 5 is a section on the line V—V of Figure 4.

As shown on the drawings:

A tube 10 is shown in section in Figures 3 and 4, a tire valve 11 being shown in Figure 3. The shape of the tube as shown is roughly a flattened ellipse in order to reduce the overall dimensions of the vulcanizing apparatus. The tube mold proper comprises an outer mold half or ring 12 having a jacketed steam space 13 and an inner mold half or ring 14 with a similar steam space 15, the joint 16 between the two rings being formed in a series of steps so that when the mold is open no metallic contact exists between the two sections while when closed shoulders 17 on either side of the tube space are forced against complementary recesses in the mating mold section to seal the tube space.

The outer mold half or ring 12 is supported on legs 18 forming a standard 19 and this ring 12 has a spider 20 bolted to the back thereof which spider supports a rearwardly extending fluid cylinder 21, the axis of which preferably coincides with the axis of the ring. A rear cover 22 for the fluid cylinder is formed as a spider with extending arms 23, parallel guide rods 24 being journaled in these arms as well as in aligned apertures in the first mentioned spider 20. The front ends 25 of the guide rods 24 are turned down to provide shoulders 26, the ends 25 passing through lugs 27 integral with the inner ring 14 and through the arms of a third spider 28, nuts 29 on the rod ends 25 clamping the lugs and spider arms tight against the shoulders 26 on the rods so that these rods both support and align the inner ring 14 in telescoping relationship to the outer ring 12.

The third spider 28 is provided for the attachment of the end of a piston rod 30, the other end of which carries a piston 31 operating within the fluid cylinder 21, the piston, as shown, being packed by a pair of cup leather seals 32 clamped back to back in the piston.

Locking pins 33 are bolted to the arms of the third spider 28 and slide in apertures in the first spider 20. A locking ring 34 is rotatably mounted on the back of this spider around the fluid cylinder, the ring being held in place by a pair of screws 35 extending through slots 36 in the ring 34. This ring is provided with apertures 37 through which the locking pins can slide when the plate is turned to align the apertures with the pins. Narrower slots 38 extend from the apertures 37, the pins 33 being grooved at 39 to enter these slots, and the ring 34 alongside the slots is built up in wedge like form as indicated at 40 at the center of Figure 4; this wedge acting against the outer shoulder of the groove 39 in the pin to lock and draw the inner ring 14 tight against the outer ring. This locking operation is performed by rotating the ring 34 clockwise into the position shown in Figure 5, as by grasping a handle 41. The reverse rotation of the ring 34 aligns the large apertures 37 with the pins 33 and thus unlocks the mold permitting opening thereof.

In the operation of this device, with the mold open as shown in dotted lines in Figure 3, the raw tube 10 is placed in the cavity in the inner ring 14 which is then drawn back into the outer ring by suitable manipulation of valves admitting and exhausting fluid from the fluid cylinder. With the molds closed the locking ring 34 is rotated clockwise to engage the locking pins 33 and then the tube is inflated in the mold cavity in the usual manner and the vulcanizing operation carried out. Next the locking ring is released and the mold opened up by manipulation of the fluid cylinder control valves when the completed tube can be removed and replaced with another raw tube.

We are aware that many changes may be made and numerous details of construction may be varied through a wide range without departing from the principles of this invention and we, therefore, do not purpose limiting the patent granted hereon, otherwise than necessitated by the prior art.

We claim as our invention:

1. A tube vulcanizer, comprising a two part casing formed as inner ring and an outer ring, having a tube cavity formed therebetween, a fluid cylinder secured to the outer ring, a piston in said cylinder with its piston rod secured to the inner ring, guide rods secured to said inner ring and slidably associated with said outer ring whereby said inner ring is adapted to be axially movable relative to said outer ring, locking pins having grooves therein, and means adapted to engage in said grooves when said casing parts are in closed position.

2. An individual vulcanizer, comprising concentric fixed and axially movable casing halves defining a vulcanizing cavity therebetween, means supporting and guiding said movable casing half relative to said fixed casing half and locking means for clamping said casing halves together, comprising circumferentially grooved pins secured to one of said casing halves and slidable in the other thereof, and a rotating ring having clearance apertures for said pins and adjacent raised surfaces having narrow slots adapted to engage the grooves in said pins upon partial rotation of said ring.

3. An individual vulcanizer, comprising concentric fixed and axially movable casing halves defining a vulcanizing cavity therebetween, means supporting and guiding said movable casing half relative to said fixed casing half, a fluid cylinder and piston associated with said casing halves adapted to shift the movable half and locking means for clamping said casing halves together, comprising circumferentially grooved pins secured to one of said casing halves and slidable in the other thereof, and a rotating ring having clearance apertures for said pins and adjacent raised surfaces having narrow slots adapted to engage the grooves in said pins upon partial rotation of said ring.

4. An individual vulcanizer, comprising concentric fixed and axially movable casing halves defining a vulcanizing cavity therebetween, means supporting and guiding said movable casing half relative to said fixed casing half, fluid actuated means adapted to move said movable casing half, and locking means for clamping said casing halves together, comprising circumferentially grooved pins secured to one of said casing halves and slidable in the other thereof, and a rotating ring having clearance apertures for said pins and adjacent raised surfaces having narrow slots adapted to engage the grooves in said pins upon partial rotation of said ring.

5. An individual tube vulcanizer, comprising inner and outer telescoping members defining a tube cavity therebetween in one position, means adapted to move one of said members substantially clear of the other of said members for loading and unloading the vulcanizer and means adapted to lock said members together in their closed position.

6. An individual tube vulcanizer, comprising inner and outer telescoping members defining a tube cavity therebetween in one position, means adapted to move one of said members substantially clear of the other of said members for loading and unloading the vulcanizer, guiding means for aligning said telescoping members, a plurality of locking members and means adapted to simultaneously engage said locking members.

7. An individual tube vulcanizer, comprising inner and outer telescoping members defining a tube cavity therebetween in one position, means adapted to move one of said members substantially clear of the other of said members for loading and unloading the vulcanizer, a plurality of locking pins secured to one of said members and slidably associated with the other of said members, and means adapted to simultaneously engage said locking pins.

8. An individual tube vulcanizer, comprising inner and outer telescoping members defining a tube cavity therebetween in one position, and means adapted to lock said members together in their closed position.

9. In a device of the class described, a pair of steam jacketed mold halves telescopically engaged together, means adapted to advance one mold half relative to the other to expose the mold cavity therein, and means adapted to lock said mold halves together in their closed position.

10. In a device of the class described, a pair of steam jacketed mold halves telescopically engaged together, means adapted to advance one mold half relative to the other to expose the mold cavity therein, guiding means for aligning said telescoping halves, and means adapted to lock said mold halves together in their closed position.

11. In a device of the class described, a pair of steam jacketed mold halves telescopically engaged together, means adapted to advance one mold half relative to the other to expose the mold cavity therein, a plurality of locking pins rigidly associated with one of said mold halves and slidably associated with the other mold half, and means adapted to simultaneously engage said locking pins.

12. In a device of the class described, a pair of steam jacketed mold halves telescopically engaged together, means adapted to advance one mold half relative to the other to expose the mold cavity therein, guiding means for aligning said telescoping halves, a plurality of locking pins rigidly associated with one of said mold halves and slidably associated with the other half, and means adapted to simultaneously engage said locking pins.

13. In a device of the class described, a pair of steam jacketed mold halves telescopically engaged together, and means adapted to lock said mold halves together in their closed position.

14. In a device of the class described, a pair of steam jacketed mold halves telescopically engaged together, a plurality of locking pins rigidly associated with one of said mold halves and slidably associated with the other mold half, and means adapted to simultaneously engage said locking pins.

15. A tube vulcanizer comprising a two part casing consisting of an inner ring and an outer ring having a tube cavity formed therebetween, a fluid cylinder carried by and axially aligned with one of said rings, a piston in said cylinder having a piston rod connected to the other ring, guide means connected to one of said rings and slidably associated with the other ring whereby one of said rings may be moved axially relative to the other ring by said piston and means at substantially the rear end of said cylinder for cooperation with said guide means and with which said guide means is slidably associated.

In testimony whereof, we have hereunto subscribed our names at Eau Claire, Eau Claire County, Wisconsin.

RALPH W. HUTCHENS.
ARNOLD R. KRAUSE.